US012177385B2

(12) United States Patent
Swerdlow

(10) Patent No.: US 12,177,385 B2
(45) Date of Patent: Dec. 24, 2024

(54) COMMUNICATION FORWARDING BASED ON CONTENT ANALYSIS

(71) Applicant: Zoom Video Communications, Inc., San Jose, CA (US)

(72) Inventor: Nick Swerdlow, Santa Clara, CA (US)

(73) Assignee: Zoom Video Communications, Inc., San Jose, CA (US)

( * ) Notice: Subject to any disclaimer, the term of this patent is extended or adjusted under 35 U.S.C. 154(b) by 497 days.

(21) Appl. No.: 17/510,565

(22) Filed: Oct. 26, 2021

(65) Prior Publication Data

US 2023/0126032 A1 Apr. 27, 2023

(51) Int. Cl.
*H04M 3/533* (2006.01)
*H04M 3/42* (2006.01)

(52) U.S. Cl.
CPC ... *H04M 3/53383* (2013.01); *H04M 3/42025* (2013.01); *H04M 3/53325* (2013.01); *H04M 2203/4536* (2013.01)

(58) Field of Classification Search
CPC ..... H04L 51/58; H04M 1/72436; H04W 4/12; H04W 4/14
See application file for complete search history.

(56) References Cited

U.S. PATENT DOCUMENTS

| | | | |
|---|---|---|---|
| 8,750,463 B2 | 6/2014 | Doulton | |
| 8,977,241 B2 | 3/2015 | Sigmund et al. | |
| 2002/0137490 A1* | 9/2002 | Gallant | H04L 67/52 |
| | | | 455/411 |
| 2004/0203617 A1* | 10/2004 | Knauerhase | H04W 88/04 |
| | | | 455/445 |
| 2008/0205605 A1 | 8/2008 | Gao et al. | |
| 2009/0083032 A1* | 3/2009 | Jablokov | G10L 15/26 |
| | | | 704/235 |
| 2013/0024780 A1* | 1/2013 | Sutedja | G06Q 10/107 |
| | | | 715/752 |
| 2016/0140965 A1* | 5/2016 | Kumar | H04N 21/233 |
| | | | 704/9 |
| 2019/0102396 A1* | 4/2019 | Pan | H04L 51/52 |
| 2019/0319902 A1* | 10/2019 | Kao | H04L 51/04 |
| 2021/0176198 A1* | 6/2021 | Cudak | H04L 51/48 |

OTHER PUBLICATIONS

Voicemail Forwarding, Share voicemail via text or email., YouMail, https://www.youmail.com/home/feature/voicemail-forwarding, Oct. 26, 2021, 4 pages.

* cited by examiner

*Primary Examiner* — Charles N Appiah
*Assistant Examiner* — Frank E Donado
(74) *Attorney, Agent, or Firm* — Young Basile Hanlon & MacFarlane, P.C.

(57) ABSTRACT

A communication directed to a recipient is stored in a message box of the recipient. A forwardee is identified based on an analysis of the communication. A request is received to transmit the communication to the forwardee. The communication is forwarded to a message box of the forwardee.

19 Claims, 8 Drawing Sheets

COMMUNICATION FORWARDING BASED ON CONTENT ANALYSIS

FIELD

The present disclosure relates generally to communication management and, more specifically, to forwarding communications based on content analyses of the communications.

BRIEF DESCRIPTION OF THE DRAWINGS

This disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION OF THE DRAWINGS

Figure 1:
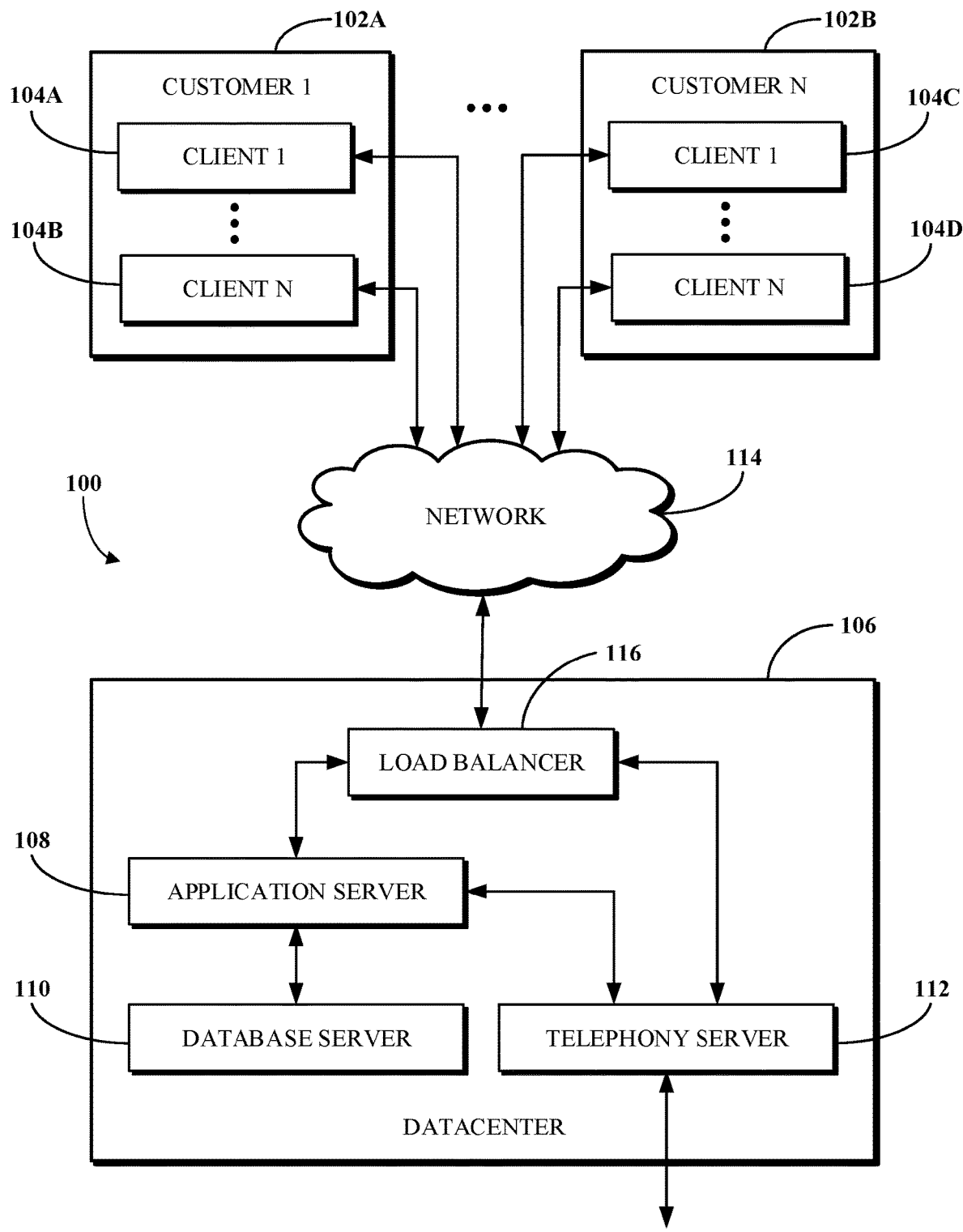
FIG. 1 is a block diagram of an example of an electronic computing and communications system.

Voicemail (VM) software, which may be standalone software used for telephony services or included in a software platform such as a unified communications as a service (UCaaS) platform, may allow a caller (i.e., a person calling someone) to leave a VM in a VM inbox of a callee (i.e., a person being called). The callee may access his/her VM inbox via one or more interfaces or access modalities to, for example, listen to, reply to, or delete a VM left in his/her VM inbox. The callee may also be able to forward the VM to a forwardee. To illustrate, using a telephone, the callee may access his or her VM inbox, listen to a VM saved in the VM inbox, and enter a key combination (e.g., #–3) to initiate the forwarding of the VM to a forwardee.

The callee may want to forward a VM to a forwardee for several reasons. For example, the callee may direct the forwardee, who may be a member of a same team as the callee, to resolve any requests embedded in the VM. In another example, the callee may forward the VM to one or more persons for awareness only. In some situations, the callee may forward the VM to the forwardee because the VM may actually have been intended for the forwardee but the caller left the VM in the VM inbox of the callee instead. If the callee can identify the forwardee (i.e., the intended callee) and knows or can obtain the contact information (e.g., an extension, an email address) of the forwardee, then the callee can forward the VM to the forwardee.

Conventional VM software may prompt the callee to enter a telephone number, an extension number, or the name of the forwardee. In response to receiving the telephone number, the extension number, or the name from the callee, the VM software may forward the VM to the forwardee. Forwarding the VM to the forwardee may include creating a copy of the VM and storing the copy in a VM inbox of the forwardee.

However, such conventional approaches to VM forwarding do not effectively facilitate the identification of forwardees due to technical limitations of the VM software. In one scenario, if the callee cannot easily identify a forwardee, then the callee may simply ignore the VM; in another scenario, the callee may simply (erroneously) guess a forwardee; and in yet another scenario, the callee may simply forward the VM to another person and task that other person with identifying the forwardee. In such cases, the caller may either never receive a response or, at best, a response may be delayed. Such situations may reflect negatively on the organization of the caller and may result in loss of good will, reputation, customer satisfaction, and other such criteria that may impact the organization.

Furthermore, the use of conventional VM software services of a software platform, such as a UCaaS platform, can result in a waste in compute and network resources (collectively, compute resources). For example, because compute resources are used when VMs are forwarded, conventional VM software services can waste compute resources by allowing the forwarding of VMs to parties other than those who should have actually received the VMs in the first place. To illustrate, storage is required to store copies of VMs in the forwardees' VM inboxes, processor time is required to obtain the copies and store the copies in the VM inboxes, network resources and compute resources may be expended in the process of generating user interfaces that the wrong forwardees use to access their VM inboxes and listen to VMs that should not have been directed to them in the first place, and so on. Additionally, forwarding a VM can include using compute resources (e.g., personal compute device, server devices, or networks) to perform investigation and/or background research to identify a forwardee. Performing such investigation and/or background research also results in a waste of compute resources.

The ineffective facilitation of the forwardee identification, and the attendant redundant use of compute resources, can degrade performance of the compute resources by or otherwise of the software platform. The possibility of degraded performance may also include substantially increased investment (such as to compensate for the degradation) in processing, memory, and storage resources, and may also result in increased energy expenditures (needed to operate those increased processing, memory, and storage resources, and for the network transmission of the database commands) and associated emissions that may result from the generation of that energy.

Implementations of this disclosure address problems such as these by identifying (e.g., inferring) one or more potential forwardees for a VM so that compute resources are not wasted when a callee may not know who the forwardee should be. Software according to the implementations of this disclosure can analyze the content of the VM to identify the one or more potential forwardees. The callee can select one or more of the identified potential forwardees identified by the software to whom the software is to forward the VM. In some implementations, the software may be software of a UCaaS platform which includes telephony services and other services.

While the disclosure herein is mainly described with respect to one type of communication (specifically, voice-based VMs), the disclosure is not so limited. The teachings herein can be used to identify forwardees for various types of communication received by a recipient where the forwardees are identified based on a content analysis of the communication. The communication can be any type of communication that may be received by a first user (referred to herein as a "recipient" or "callee") but, for example, should in fact be directed to a second user (referred to herein as a "forwardee").

That a recipient receives a communication can mean that contact information of the recipient is used to transmit the communication to the first user. The implementations of this disclosure, such as using a UCaaS platform or otherwise, can use the contact information of the recipient to associate a received communication with the recipient, such as by storing or associating the communication with a message box (a communications inbox) of the recipient. To illustrate, an email address associated with the recipient may be used by a sender to transmit an email or a voice message to the first user; a telephone number associated with the callee (i.e., a telephone device associated with the callee) may be used by a caller to leave a VM or a video mail in an inbox of the recipient (i.e., callee) or to transmit a text message (including a short message service (SMS)) to the device associated with the recipient. As such, depending on the type of the communication, the message box can be a VM inbox, a video inbox, an email inbox, a text message chain, and the like.

For ease of reference, the disclosure herein may at times refer to a forwardee as a user or a person. However, the disclosure is not so limited. A forwardee of a communication can be any entity that is configured with contact information capable of receiving communications of the same type as the communication. For example, with respect to VMs, a forwardee can be person assigned a telephone number or a group of users that share the same telephone number, and as such the group can share or have access to a shared VM inbox. For example, with respect to emails, a forwardee can be a person assigned an email address, a group of users that is associated with an email distribution list, or the like.

To describe some implementations in greater detail, reference is first made to examples of hardware and software structures used to implement communication forwarding based on content analysis.

FIG. 1 is a block diagram of an example of an electronic computing and communications system 100, which can be or include a distributed computing system (e.g., a client-server computing system), a cloud computing system, a clustered computing system, or the like.

The system 100 includes one or more customers, such as customers 102A through 102B, which may each be a public entity, private entity, or another corporate entity or individual that purchases or otherwise uses software services, such as of a UCaaS platform provider. Each customer can include one or more clients. For example, as shown and without limitation, the customer 102A can include clients 104A through 104B, and the customer 102B can include clients 104C through 104D. A customer can include a customer network or domain. For example, and without limitation, the clients 104A through 104B can be associated or communicate with a customer network or domain for the customer 102A and the clients 104C through 104D can be associated or communicate with a customer network or domain for the customer 102B.

A client, such as one of the clients 104A through 104D, may be or otherwise refer to one or both of a client device or a client application. Where a client is or refers to a client device, the client can comprise a computing system, which can include one or more computing devices, such as a mobile phone, a tablet computer, a laptop computer, a notebook computer, a desktop computer, or another suitable computing device or combination of computing devices. Where a client instead is or refers to a client application, the client can be an instance of software running on a customer device (e.g., a client device or another device). In some implementations, a client can be implemented as a single physical unit or as a combination of physical units. In some implementations, a single physical unit can include multiple clients.

The system 100 can include a number of customers and/or clients or can have a configuration of customers or clients different from that generally illustrated in FIG. 1. For example, and without limitation, the system 100 can include hundreds or thousands of customers, and at least some of the customers can include or be associated with a number of clients.

The system 100 includes a datacenter 106, which may include one or more servers. The datacenter 106 can represent a geographic location, which can include a facility, where the one or more servers are located. The system 100 can include a number of datacenters and servers or can include a configuration of datacenters and servers different from that generally illustrated in FIG. 1. For example, and without limitation, the system 100 can include tens of datacenters, and at least some of the datacenters can include hundreds or another suitable number of servers. In some implementations, the datacenter 106 can be associated or communicate with one or more datacenter networks or domains, which can include domains other than the customer domains for the customers 102A through 102B.

The datacenter 106 includes servers used for implementing software services of a UCaaS platform. The datacenter 106 as generally illustrated includes an application server 108, a database server 110, and a telephony server 112. The servers 108 through 112 can each be a computing system, which can include one or more computing devices, such as a desktop computer, a server computer, or another computer capable of operating as a server, or a combination thereof. A suitable number of each of the servers 108 through 112 can be implemented at the datacenter 106. The UCaaS platform uses a multi-tenant architecture in which installations or instantiations of the servers 108 through 112 is shared amongst the customers 102A through 102B.

In some implementations, one or more of the servers 108 through 112 can be a non-hardware server implemented on a physical device, such as a hardware server. In some implementations, a combination of two or more of the application server 108, the database server 110, and the telephony server 112 can be implemented as a single hardware server or as a single non-hardware server implemented on a single hardware server. In some implementations, the datacenter 106 can include servers other than or in addition to the servers 108 through 112, for example, a media server, a proxy server, or a web server.

The application server 108 runs web-based software services deliverable to a client, such as one of the clients 104A through 104D. As described above, the software services may be of a UCaaS platform. For example, the application server 108 can implement all or a portion of a UCaaS platform, including conferencing software, messaging software, and/or other intra-party or inter-party communications software. The application server 108 may, for example, be or include a unitary Java Virtual Machine (JVM).

In some implementations, the application server 108 can include an application node, which can be a process executed on the application server 108. For example, and without limitation, the application node can be executed in order to deliver software services to a client, such as one of the clients 104A through 104D, as part of a software application. The application node can be implemented using processing threads, virtual machine instantiations, or other computing features of the application server 108. In some such implementations, the application server 108 can include a suitable number of application nodes, depending upon a system load or other characteristics associated with the application server 108. For example, and without limitation, the application server 108 can include two or more nodes forming a node cluster. In some such implementations, the application nodes implemented on a single application server 108 can run on different hardware servers.

The database server 110 stores, manages, or otherwise provides data for delivering software services of the application server 108 to a client, such as one of the clients 104A through 104D. In particular, the database server 110 may implement one or more databases, tables, or other information sources suitable for use with a software application implemented using the application server 108. The database server 110 may include a data storage unit accessible by software executed on the application server 108. A database implemented by the database server 110 may be a relational database management system (RDBMS), an object database, an XML database, a configuration management database (CMDB), a management information base (MIB), one or more flat files, other suitable non-transient storage mechanisms, or a combination thereof. The system 100 can include one or more database servers, in which each database server can include one, two, three, or another suitable number of databases configured as or comprising a suitable database type or combination thereof.

In some implementations, one or more databases, tables, other suitable information sources, or portions or combinations thereof may be stored, managed, or otherwise provided by one or more of the elements of the system 100 other than the database server 110, for example, the client 104 or the application server 108.

The telephony server 112 enables network-based telephony and web communications from and to clients of a customer, such as the clients 104A through 104B for the customer 102A or the clients 104C through 104D for the customer 102B. Some or all of the clients 104A through 104D may be voice over internet protocol (VOIP)-enabled devices configured to send and receive calls over a network 114. In particular, the telephony server 112 includes a session initiation protocol (SIP) zone and a web zone. The SIP zone enables a client of a customer, such as the customer 102A or 102B, to send and receive calls over the network 114 using SIP requests and responses. The web zone integrates telephony data with the application server 108 to enable telephony-based traffic access to software services run by the application server 108. Given the combined functionality of the SIP zone and the web zone, the telephony server 112 may be or include a cloud-based private branch exchange (PBX) system.

The SIP zone receives telephony traffic from a client of a customer and directs same to a destination device. The SIP zone may include one or more call switches for routing the telephony traffic. For example, to route a VOIP call from a first VOIP-enabled client of a customer to a second VOIP-enabled client of the same customer, the telephony server 112 may initiate a SIP transaction between a first client and the second client using a PBX for the customer. However, in another example, to route a VOIP call from a VOIP-enabled client of a customer to a client or non-client device (e.g., a desktop phone which is not configured for VOIP communication) which is not VOIP-enabled, the telephony server 112 may initiate a SIP transaction via a VOIP gateway that transmits the SIP signal to a public switched telephone network (PSTN) system for outbound communication to the non-VOIP-enabled client or non-client phone. Hence, the telephony server 112 may include a PSTN system and may in some cases access an external PSTN system.

The telephony server 112 includes one or more session border controllers (SBCs) for interfacing the SIP zone with one or more aspects external to the telephony server 112. In particular, an SBC can act as an intermediary to transmit and receive SIP requests and responses between clients or non-client devices of a given customer with clients or non-client devices external to that customer. When incoming telephony traffic for delivery to a client of a customer, such as one of the clients 104A through 104D, originating from outside the telephony server 112 is received, a SBC receives the traffic and forwards it to a call switch for routing to the client.

In some implementations, the telephony server 112, via the SIP zone, may enable one or more forms of peering to a carrier or customer premise. For example, Internet peering to a customer premise may be enabled to ease the migration of the customer from a legacy provider to a service provider operating the telephony server 112. In another example, private peering to a customer premise may be enabled to leverage a private connection terminating at one end at the telephony server 112 and at the other end at a computing aspect of the customer environment. In yet another example, carrier peering may be enabled to leverage a connection of a peered carrier to the telephony server 112.

In some such implementations, a SBC or telephony gateway within the customer environment may operate as an intermediary between the SBC of the telephony server 112 and a PSTN for a peered carrier. When an external SBC is first registered with the telephony server 112, a call from a client can be routed through the SBC to a load balancer of the SIP zone, which directs the traffic to a call switch of the telephony server 112. Thereafter, the SBC may be configured to communicate directly with the call switch.

The web zone receives telephony traffic from a client of a customer, via the SIP zone, and directs same to the application server 108 via one or more Domain Name System (DNS) resolutions. For example, a first DNS within the web zone may process a request received via the SIP zone and then deliver the processed request to a web service which connects to a second DNS at or otherwise associated with the application server 108. Once the second DNS resolves the request, it is delivered to the destination service at the application server 108. The web zone may also include a database for authenticating access to a software application for telephony traffic processed within the SIP zone, for example, a softphone.

The clients 104A through 104D communicate with the servers 108 through 112 of the datacenter 106 via the network 114. The network 114 can be or include, for example, the Internet, a local area network (LAN), a wide area network (WAN), a virtual private network (VPN), or another public or private means of electronic computer communication capable of transferring data between a client and one or more servers. In some implementations, a client can connect to the network 114 via a communal connection point, link, or path, or using a distinct connection point, link, or path. For example, a connection point, link, or path can be wired, wireless, use other communications technologies, or a combination thereof.

The network 114, the datacenter 106, or another element, or combination of elements, of the system 100 can include network hardware such as routers, switches, other network devices, or combinations thereof. For example, the datacenter 106 can include a load balancer 116 for routing traffic from the network 114 to various servers associated with the datacenter 106. The load balancer 116 can route, or direct, computing communications traffic, such as signals or messages, to respective elements of the datacenter 106.

For example, the load balancer 116 can operate as a proxy, or reverse proxy, for a service, such as a service provided to one or more remote clients, such as one or more of the clients 104A through 104D, by the application server 108, the telephony server 112, and/or another server. Routing functions of the load balancer 116 can be configured directly or via a DNS. The load balancer 116 can coordinate requests from remote clients and can simplify client access by masking the internal configuration of the datacenter 106 from the remote clients.

In some implementations, the load balancer 116 can operate as a firewall, allowing or preventing communications based on configuration settings. Although the load balancer 116 is depicted in FIG. 1 as being within the datacenter 106, in some implementations, the load balancer 116 can instead be located outside of the datacenter 106, for example, when providing global routing for multiple datacenters. In some implementations, load balancers can be included both within and outside of the datacenter 106. In some implementations, the load balancer 116 can be omitted.

Figure 2:
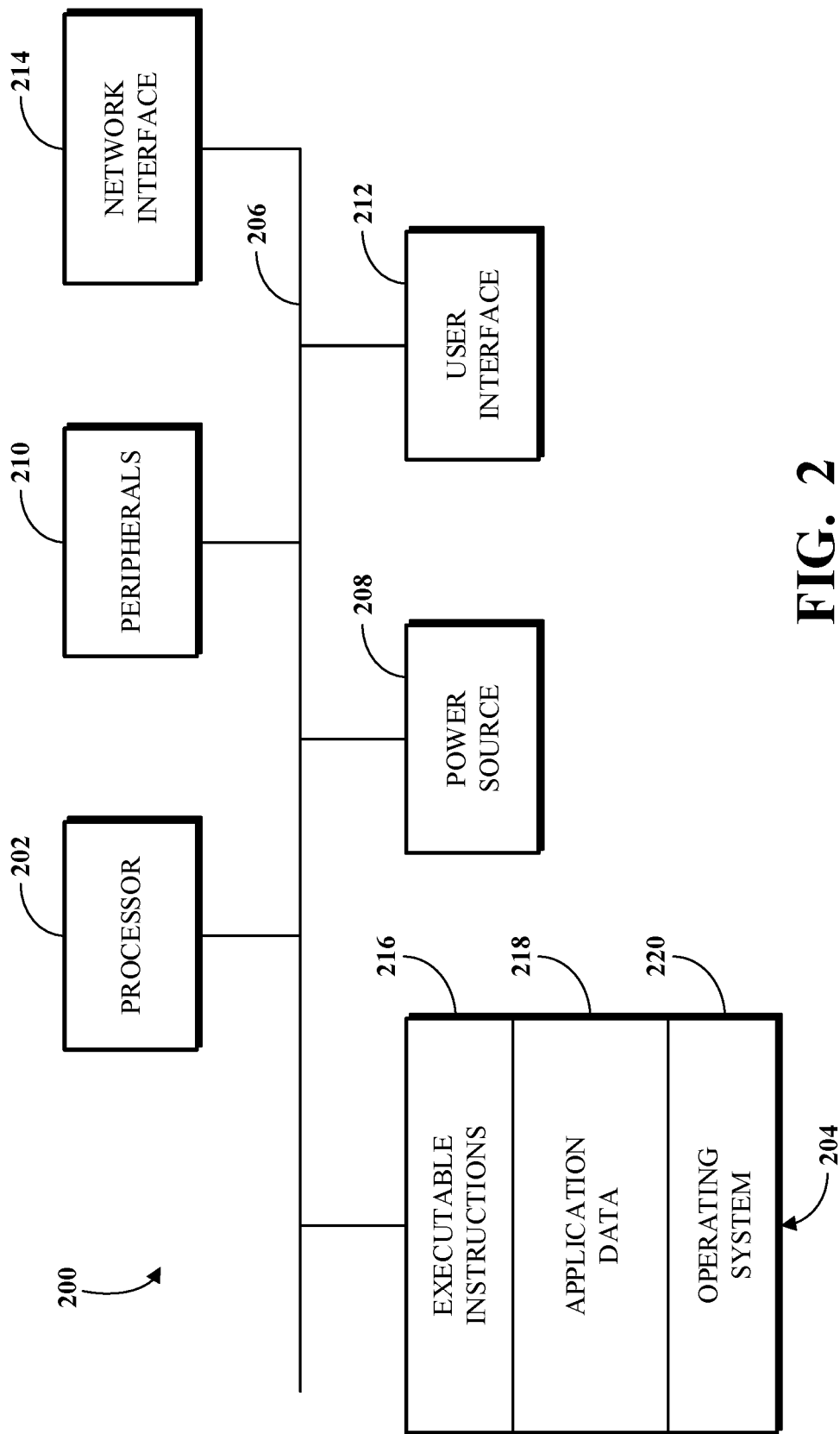
FIG. 2 is a block diagram of an example internal configuration of a computing device of an electronic computing and communications system.

FIG. 2 is a block diagram of an example internal configuration of a computing device 200 of an electronic computing and communications system. In one configuration, the computing device 200 may implement one or more of the client 104, the application server 108, the database server 110, or the telephony server 112 of the system 100 shown in FIG. 1.

The computing device 200 includes components or units, such as a processor 202, a memory 204, a bus 206, a power source 208, peripherals 210, a user interface 212, a network interface 214, other suitable components, or a combination thereof. One or more of the memory 204, the power source 208, the peripherals 210, the user interface 212, or the network interface 214 can communicate with the processor 202 via the bus 206.

The processor 202 is a central processing unit, such as a microprocessor, and can include single or multiple processors having single or multiple processing cores. Alternatively, the processor 202 can include another type of device, or multiple devices, configured for manipulating or processing information. For example, the processor 202 can include multiple processors interconnected in one or more manners, including hardwired or networked. The operations of the processor 202 can be distributed across multiple devices or units that can be coupled directly or across a local area or other suitable type of network. The processor 202 can include a cache, or cache memory, for local storage of operating data or instructions.

The memory 204 includes one or more memory components, which may each be volatile memory or non-volatile memory. For example, the volatile memory can be random access memory (RAM) (e.g., a DRAM module, such as DDR SDRAM). In another example, the non-volatile memory of the memory 204 can be a disk drive, a solid state drive, flash memory, or phase-change memory. In some implementations, the memory 204 can be distributed across multiple devices. For example, the memory 204 can include network-based memory or memory in multiple clients or servers performing the operations of those multiple devices.

The memory 204 can include data for immediate access by the processor 202. For example, the memory 204 can include executable instructions 216, application data 218, and an operating system 220. The executable instructions 216 can include one or more application programs, which can be loaded or copied, in whole or in part, from non-volatile memory to volatile memory to be executed by the processor 202. For example, the executable instructions 216 can include instructions for performing some or all of the techniques of this disclosure. The application data 218 can include user data, database data (e.g., database catalogs or dictionaries), or the like. In some implementations, the application data 218 can include functional programs, such as a web browser, a web server, a database server, another program, or a combination thereof. The operating system 220 can be, for example, Microsoft Windows®, Mac OS X®, or Linux®; an operating system for a mobile device, such as a smartphone or tablet device; or an operating system for a non-mobile device, such as a mainframe computer.

The power source 208 provides power to the computing device 200. For example, the power source 208 can be an interface to an external power distribution system. In another example, the power source 208 can be a battery, such as where the computing device 200 is a mobile device or is otherwise configured to operate independently of an external power distribution system. In some implementations, the computing device 200 may include or otherwise use multiple power sources. In some such implementations, the power source 208 can be a backup battery.

The peripherals 210 includes one or more sensors, detectors, or other devices configured for monitoring the computing device 200 or the environment around the computing device 200. For example, the peripherals 210 can include a geolocation component, such as a global positioning system location unit. In another example, the peripherals can include a temperature sensor for measuring temperatures of components of the computing device 200, such as the processor 202. In some implementations, the computing device 200 can omit the peripherals 210.

The user interface 212 includes one or more input interfaces and/or output interfaces. An input interface may, for example, be a positional input device, such as a mouse, touchpad, touchscreen, or the like; a keyboard; or another suitable human or machine interface device. An output interface may, for example, be a display, such as a liquid crystal display, a cathode-ray tube, a light emitting diode display, or other suitable display.

The network interface 214 provides a connection or link to a network (e.g., the network 114 shown in FIG. 1). The network interface 214 can be a wired network interface or a wireless network interface. The computing device 200 can communicate with other devices via the network interface 214 using one or more network protocols, such as using Ethernet, transmission control protocol (TCP), internet protocol (IP), power line communication, an IEEE 802.X protocol (e.g., Wi-Fi, Bluetooth, or ZigBee), infrared, visible light, general packet radio service (GPRS), global system for mobile communications (GSM), code-division multiple access (CDMA), Z-Wave, another protocol, or a combination thereof.

Figure 3:
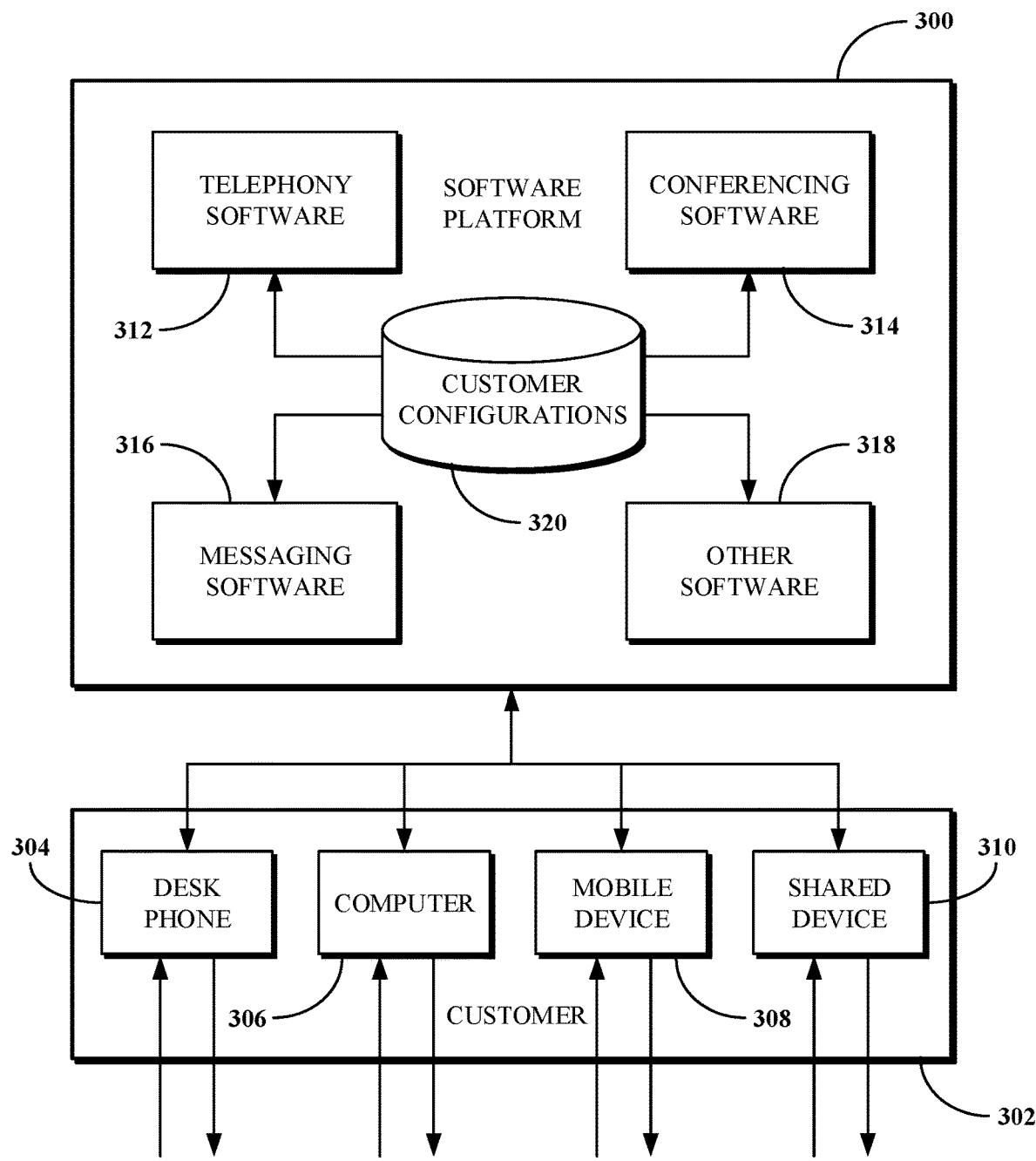
FIG. 3 is a block diagram of an example of a software platform implemented by an electronic computing and communications system.

FIG. 3 is a block diagram of an example of a software platform 300 implemented by an electronic computing and communications system, for example, the system 100 shown in FIG. 1. The software platform 300 is a UCaaS platform accessible by clients of a customer of a UCaaS platform provider, for example, the clients 104A through 104B of the customer 102A or the clients 104C through 104D of the customer 102B shown in FIG. 1. The software platform 300 may be a multi-tenant platform instantiated using one or more servers at one or more datacenters including, for example, the application server 108, the database server 110, and the telephony server 112 of the datacenter 106 shown in FIG. 1.

The software platform 300 includes software services accessible using one or more clients. For example, a customer 302 as shown includes four clients-a desk phone 304, a computer 306, a mobile device 308, and a shared device 310. The desk phone 304 is a desktop unit configured to at least send and receive calls and includes an input device for receiving a telephone number or extension to dial to and an output device for outputting audio and/or video for a call in progress. The computer 306 is a desktop, laptop, or tablet computer including an input device for receiving some form of user input and an output device for outputting information in an audio and/or visual format. The mobile device 308 is a smartphone, wearable device, or other mobile computing aspect including an input device for receiving some form of user input and an output device for outputting information in an audio and/or visual format. The desk phone 304, the computer 306, and the mobile device 308 may generally be considered personal devices configured for use by a single user. The shared device 310 is a desk phone, a computer, a mobile device, or a different device which may instead be configured for use by multiple specified or unspecified users.

Each of the clients 304 through 310 includes or runs on a computing device configured to access at least a portion of the software platform 300. In some implementations, the customer 302 may include additional clients not shown. For example, the customer 302 may include multiple clients of one or more client types (e.g., multiple desk phones or multiple computers) and/or one or more clients of a client type not shown in FIG. 3 (e.g., wearable devices or televisions other than as shared devices). For example, the customer 302 may have tens or hundreds of desk phones, computers, mobile devices, and/or shared devices.

The software services of the software platform 300 generally relate to communications tools, but are in no way limited in scope. As shown, the software services of the software platform 300 include telephony software 312, conferencing software 314, messaging software 316, and other software 318. Some or all of the software 312 through 318 uses customer configurations 320 specific to the customer 302. The customer configurations 320 may, for example, be data stored within a database or other data store at a database server, such as the database server 110 shown in FIG. 1.

The telephony software 312 enables telephony traffic between ones of the clients 304 through 310 and other telephony-enabled devices, which may be other ones of the clients 304 through 310, other VOIP-enabled clients of the customer 302, non-VOIP-enabled devices of the customer 302, VOIP-enabled clients of another customer, non-VOIP-enabled devices of another customer, or other VOIP-enabled clients or non-VOIP-enabled devices. Calls sent or received using the telephony software 312 may, for example, be sent or received using the desk phone 304, a softphone running on the computer 306, a mobile application running on the mobile device 308, or using the shared device 310 that includes telephony features.

The telephony software 312 further enables phones that do not include a client application to connect to other software services of the software platform 300. For example, the telephony software 312 may receive and process calls from phones not associated with the customer 302 to route that telephony traffic to one or more of the conferencing software 314, the messaging software 316, or the other software 318.

The conferencing software 314 enables audio, video, and/or other forms of conferences between multiple participants, such as to facilitate a conference between those participants. In some cases, the participants may all be physically present within a single location, for example, a conference room, in which the conferencing software 314 may facilitate a conference between only those participants and using one or more clients within the conference room. In some cases, one or more participants may be physically present within a single location and one or more other participants may be remote, in which the conferencing software 314 may facilitate a conference between all of those participants using one or more clients within the conference room and one or more remote clients. In some cases, the participants may all be remote, in which the conferencing software 314 may facilitate a conference between the participants using different clients for the participants. The conferencing software 314 can include functionality for hosting, presenting scheduling, joining, or otherwise participating in a conference. The conferencing software 314 may further include functionality for recording some or all of a conference and/or documenting a transcript for the conference.

The messaging software 316 enables instant messaging, unified messaging, and other types of messaging communications between multiple devices, such as to facilitate a chat or other virtual conversation between users of those devices. The unified messaging functionality of the messaging software 316 may, for example, refer to email messaging which includes a voicemail transcription service delivered in email format.

The other software 318 enables other functionality of the software platform 300. Examples of the other software 318 include, but are not limited to, device management software, resource provisioning and deployment software, administrative software, third party integration software, and the like. In one particular example, the other software 318 can include software for communications forwarding based on content analyses and for forwarding those communications accordingly.

The software 312 through 318 may be implemented using one or more servers, for example, of a datacenter such as the datacenter 106 shown in FIG. 1. For example, one or more of the software 312 through 318 may be implemented using an application server, a database server, and/or a telephony server, such as the servers 108 through 112 shown in FIG. 1. In another example, one or more of the software 312 through 318 may be implemented using servers not shown in FIG. 1, for example, a meeting server, a web server, or another server. In yet another example, one or more of the software 312 through 318 may be implemented using one or more of the servers 108 through 112 and one or more other servers. The software 312 through 318 may be implemented by different servers or by the same server.

Features of the software services of the software platform 300 may be integrated with one another to provide a unified experience for users. For example, the messaging software 316 may include a user interface element configured to initiate a call with another user of the customer 302. In another example, the telephony software 312 may include functionality for elevating a telephone call to a conference. In yet another example, the conferencing software 314 may include functionality for sending and receiving instant messages between participants and/or other users of the customer 302. In yet another example, the conferencing software 314 may include functionality for file sharing between participants and/or other users of the customer 302. In some implementations, some or all of the software 312 through 318 may be combined into a single software application run on clients of the customer, such as one or more of the clients 304 through 310.

Figure 4:
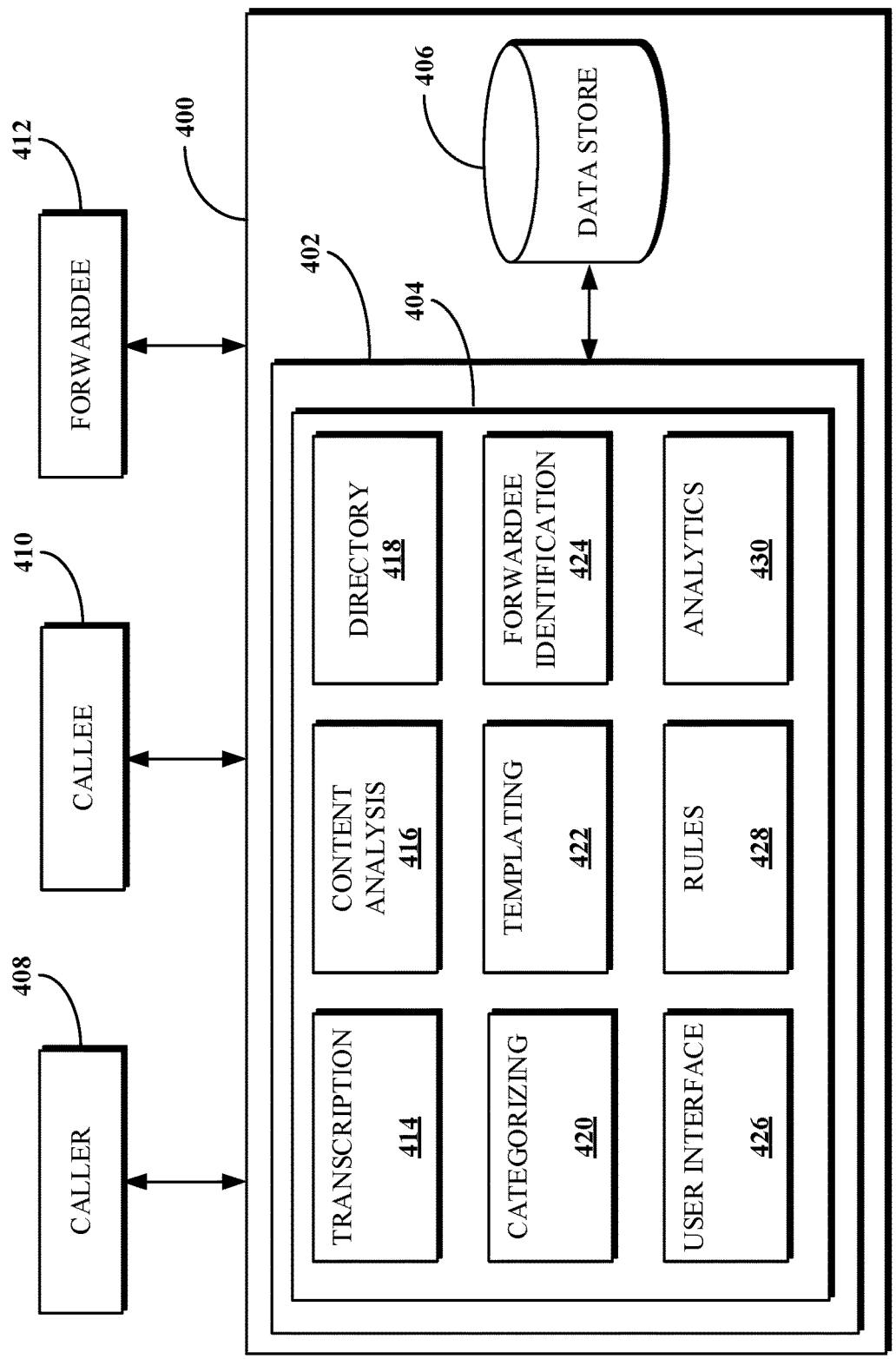
FIG. 4 is a block diagram of an example of a system that provides forwardee suggestions for a communication based on content analysis of the communication.

FIG. 4 is a block diagram of an example of a server 400 that provides forwardee suggestions for a communication based on content analysis of the communication. The server 400 may be mainly described with respect to one type of communication; namely, VMs. However, as mentioned above, the communication can be any type of communication with respect to which content analysis can be performed. The communication can be a text-based communication or a voice-based communication. A voice-based communication is a communication that includes voice data (i.e., voice communication, audio data representative of human speech). Examples of voice-based communications include VMs and video-based messages. Examples of text-based communications include emails and text messages, including SMS messages.

As shown, a server 400 implements or includes a software platform 402 and a data store 406. The server 400 can be one or more servers implemented by or included in a datacenter, such as the datacenter 106 of FIG. 1. The software platform 402 provides communications inbox services (e.g., capabilities or functionality), including VM inbox services via a communication software 404. The software platform 402 can be or can be part of the software platform 300 of FIG. 3. The communication software 404 can be variously implemented in connection with the software platform 402. For example, the communication software 404 can be included in or can work in conjunction with one or more of the telephony software 312, the messaging software 316, or the other software 318 of FG. 3. For example, in an implementation, the communication software 404 may be or may be integrated within the telephony software 312. The data store 406 can store data related to VMs, such as a VM that is stored in or associated with a VM inbox that is associated with or is accessible by a group of users. The data store 406 can be included in or implemented by a database server, such as the database server 110 of FIG. 1.

A caller device 408 can be used by a sender to transmit a communication to a recipient in which the recipient is a user of the server 400. For example, and in the case of a VM, the caller device 408 can be used by a caller and via telephony software of the software platform 402 to leave (e.g., cause to be saved) a VM in a VM inbox of a callee. In some situations, the caller may have left the VM in the inbox of the callee when in fact another user (i.e., a forwardee) would have been a more appropriate recipient of the VM. The caller device 408 can be or can include a telephone device, a softphone, or some other device, software, or mechanism that enables the caller device 408 to dial a phone number associated with the VM. The communication software 404 may associate, such as in the data store 406, a telephone number of the caller device 408 with the VM. More broadly, and as described above, the caller device 408 can be any type of device via which a sender can cause a communication to be transmitted to a recipient. To illustrate, the sender can use the caller device 408 (e.g., can use an email application accessible via or available at the caller device 408) to compose and transmit an email to the callee (i.e., recipient).

There can be many reasons or situations why the caller may leave the VM in the VM inbox of the caller instead of the VM inbox of the more appropriate person. To illustrate, the caller may have mis-dialed the telephone number of the more appropriate person and, without realizing the error, leaves the VM in the inbox of the caller assuming that it was being left in the VM inbox of the more appropriate person. As another illustration, the caller may not specifically know the telephone number of the more appropriate person and is instead routed to a group VM inbox or to the inbox of the caller. In yet another illustration, the communication software 404 may have presented a list of user choices to the caller and the caller selected the wrong user to whom the VM is to be left.

A callee device 410 can be a device of a user associated with (e.g., enabled to access) the VM inbox. The callee device 410 may include an application (not shown) that may be a client application and the callee device 410 may be a client device, such as one of the clients 304 through 310 of FIG. 3. The callee can use the callee device 410 to interact with the VM inbox and with the VMs associated therewith (e.g., stored therein). A forwardee device 412 can be similar to or can be the callee device 410 and can be used by a forwardee to interact with the VM inbox of the forwardee and VMs associated therewith. The VM inbox of the forwardee can include VMs forwarded to the forwardee from another user. It is noted that a callee can be a forwardee with respect to some VMs; and a forwardee can be a callee with respect to other VMs.

The software platform 402 enables users to interact with and manage their respective communication inboxes, including VM inboxes, email inboxes, video-based inboxes, and other inboxes that can be used to store other types of communications received by the recipient (e.g., callee). The software platform 402 can additionally provide forwardee identification with respect to at least some of the communications, including VMs. In various implementations, the software platform 402 can include one or more of a transcription tool 414, a content analysis tool 416, a directory tool 418, a categorization tool 420, a templating tool 422, a forwardee identification tool 424, a user interface (UI) tool 426, a rules tool 428, an analytics tool 430, other tools, or a combination thereof. In some implementations, some of the tools 414 through 430 may be combined. In some implementations, at least one of the tools 414 through 430 may be split into two or more tools.

The transcription tool 414 can be used to generate (e.g., obtain) transcripts of communications. The transcription tool 414 can associate the transcript with the communication in the data store 406. In an example, the transcription tool 414 may use a service (e.g., a cloud-based service) to obtain transcripts. For example, a voice-based communication may be transmitted to the service and the service can return a transcript. The transcript of a communication can be used to obtain a content analysis result, as further described below.

In the case of a voice-based communication (such as in the case of a VM or a video-based mail), the transcript can be obtained using automatic speech recognition (ASR) software. The speech recognition model used to generate the transcript may be based on hidden Markov models, dynamic time warping, and/or neural networks. For example, the resulting transcript may be encoded as a file (e.g., a text file) that includes timestamps associated with strings.

In the case of a text-based communication (e.g., an email or a text message), the transcript may be obtained directly from the communication itself. To illustrate, the communication may be associated with, or conform to, a schema that defines the structure of the communication. As such, in an example, generating the transcript can include identifying text within a field of the communication. For example, in the case of an email, the transcript can be obtained from the "body" field of the email.

The content analysis tool 416 obtains and associates, such as in the data store 406, a content analysis result with a communication. In an example, the content analysis result can be used to identify one or more forwardees for the communication, as further described below.

The content analysis tool 416 can analyze the transcript of a communication to identify the presence of certain words in and/or identify themes or concepts associated with the transcript. The content analysis tool 416 can include such identified words, themes, and/or concepts (collectively, topics) in the content analysis result. Any number of known tools, techniques, or services can be, or can be used by, the content analysis tool 416. In an example, the content analysis tool 416 can identify a sentiment (e.g., positive, negative, neutral, angry, or irate) associated with the communication. The sentiment can be identified based on an analysis of at least one of the transcript or an audio of a communication that includes voice data (such as a VM or a video-based message). For example, the sentiment can be identified based on an analysis of the tone used in the communication. The content analysis tool 416 can also include the identified sentiment in the content analysis result.

The content analysis result may be or include a subset of the set of strings (e.g., a text summary) in the transcript that are considered most significant. The content analysis result may include a condensed version of the transcript of the communication. In an example, the subset of the set of strings or words of the condensed version of the transcript can be matched against capabilities (described below) associated with users to identify the potential forwardees.

The content analysis result may include a set of pointers or identifiers for strings of the transcript that have been identified as most relevant. For example, respective scores may be determined for strings of the transcript that reflect relevance of the strings, and these scores may be used to rank and select strings of the transcript for inclusion in the text summary. In some implementations, a machine learning model (e.g., a PreSumm model) may be trained and used to determine respective scores for strings of the transcript. For example, a machine learning model may be used to extract a text summary from the transcript. In some implementations, strings of the transcript are converted to sentence vectors and pairwise similarity metrics for the sentence vectors are used to determine respective scores for strings of the transcript.

Vectorizing a sentence can mean converting n-grams into respective vector representations of numbers. A sentence vector may have elements corresponding to words present in the transcript that are proportional to a number of occurrences of the word in the string and inversely proportional to a number of occurrences of the word in the transcript. In an example, Term Frequency-Inverse Document Frequency (TFIDF) can be used to obtain the respective vector representations of numbers. Some strings of the transcript may be excluded from the set of strings converted into respective sentence vectors. The strings may be filtered by removing stop words and only converting strings with a number of remaining words, after stop word removal, greater than a threshold (e.g., ≥3 words). The modified strings remaining after filtering may be converted to respective sentence vectors. For example, the sentence vectors may be of a dimension equal to the number of words, other than stop words, occurring at least once in the transcript so that a sentence vector has a single element corresponding to each such word occurring in the transcript. If a string corresponding to a sentence vector lacks one of these words, the corresponding element of the sentence vector may be set to zero. If a string corresponding to a sentence vector includes one or more copies of one of these words, the corresponding element of the sentence vector may be set to a non-zero value. Various vectorization techniques can be available. In an example, a word frequency based vectorization technique can be used. Any number of techniques may be utilized to convert text to numeric vectors, such as word frequency based vectorization or word semantic based vectorization. For example, in a semantics based vectorization method, various pre-trained word embeddings or Bidirectional Encoder Representations from Transformers (BERT) embeddings may be utilized to determine respective sentence vectors for strings of the transcript.

Respective scores for strings of the transcript can be determined based on the respective sentence vectors. For example, determining respective scores for strings of the transcript based on the respective sentence vectors may include determining pairwise dot products of the sentence vectors and determining a respective score for one of the strings based on a sum of the pairwise dot products for the sentence vector of the string. In some implementations, determining respective scores for strings of the transcript based on the respective sentence vectors may include constructing a graph with weighted edges whose weights are based on pairwise dot products of the sentence vectors. For example, determining respective scores for strings of the transcript based on the respective sentence vectors may include constructing a similarity matrix based on pairwise dot products of the sentence vectors, constructing a graph with vertices corresponding to strings and edges connecting vertices that are weighted with elements from the similarity matrix corresponding to the two sentences that are connected by the edge, and determining the respective score for a string as a sum of the weights for edges connected to the vertex for the string. In some implementations, other pairwise similarity scores may be used in combination with or instead of the pairwise dot products to compare sentence vectors for different strings. For example, pairwise similarity scores for the sentence vectors can be determined by one or more combinations of multiple methods such as dot product, cosine similarity, Euclidean Distance, Pearson Correlation, Jaccard Coefficient, and/or Tanimoto Coefficient.

In some implementations, a respective score for one of the strings may be determined based on other pairwise similarity scores in combination with or instead of the pairwise dot products. For example, a respective score for one of the strings may be determined using a text-rank algorithm that uses a graph with vertices corresponding to strings of the transcript and edge weights corresponding to the pairwise similarity scores and ranks or scores the strings based on the stationary distribution of a random walk on this graph. In some implementations, for strings that were excluded from the set of strings for which corresponding sentence vectors were determined, a respective score for a string may be set to zero or some other default value based on the string having less than a threshold number of words remaining (e.g., <3 words) after stop word removal.

The directory tool 418 can include and/or manage one or more directories of users. At least some of the users of the server 400 can be potential forwardees of communications. The users may be organized into groups according to one or more hierarchies, which may be stored in a data store, such as the data store 406, using any suitable format. One hierarchy can be a reporting structure hierarchy (e.g., an org-chart) that may include information such as user names, names of managers of the users, names of sub-organizations, departments, groups, etc., to which the users belong, contact information (such as email addresses, telephone numbers, office locations), and the like. The users may be grouped into project-based hierarchies. Other hierarchies are possible. Each of the hierarchies can be stored as or can be thought of as a directed graph that can be used to identify relationship strengths (e.g., degrees of separations) between any two users.

Relationship strengths may be identified in any number of ways. In a simple example, a relationship strength between a first user and a second user can be identified based on a number of edges to be traversed in a hierarchy from a first node representing the first user to a second node representing the second user. As such, if the second user is the immediate manager of the first user, then the relationship strength between the first and the second users may be 1; if the second user is a peer of the first user, then the relationship strength may be 2; if the managers of the first user and the second user report to the same manager, then the relationship strength between the first and the second users may be 4. Other ways of obtaining relationship strength are possible. For example, different weights may be associated with directions of edge traversals (e.g., upward traversal vs. downward traversal).

The directory tool 418 may receive, as inputs, a current user (e.g., a callee) and data for identifying potential forwardees in the one of more hierarchies. The directory tool 418 matches (at least partially) data associated with the users of the one or more hierarchies with the data for identifying the potential forwardees. In an example, a respective relationship strength is also associated with each of the identified potential forwardees. The data for identifying potential forwardees can be a full name, a partial name, a nickname, a job function, a title, a telephone number, an extension number, any data that may be used to identify a user, or a combination thereof.

To illustrate, if a VM starts with "Hi Joe," then the directory tool 418 may receive a request to identify, as potential forwardees, all users whose first name is Joe or Joseph; if a VM starts with "Hello, I am trying to reach the director of marketing," then the directory tool 418 may receive a request to search for users in the one or more hierarchies associated with the title "director of marketing," "marketing director," or any other titles that are semantically equivalent to "director of marketing;" and if an email includes text such as "I tried calling Bob at extension 124," then the directory tool 418 may receive a request to identify, as potential forwardees, all users whose first name is Bob or Robert and whose telephone extension is 124.

In an example, at least some of the users may be associated (such as in one or more of the hierarchies) with respective keywords, skill descriptions, job descriptions, and tags (collectively, capabilities) that can be used to identify potential forwardees. At least some of the capabilities may be described or organized according to an occupational model that may include occupation-specific descriptors and tasks.

The categorization tool 420 may associate a category (e.g., a classification) with a communication. The category may be displayed to the callee in a user interface, such as described with respect to FIG. 5. In another example, the category may be used to identify potential forwardees or to automatically forward communications to a forwardee, such as described with respect to the rules tool 428. The categorization tool 420 can use the transcript of a communication to identify a category for the communication. In an example, the categorization tool 420 may use natural language processing (NLP) techniques to identify the category. In an example, the categorization tool 420 may be or include a machine learning model that is trained to receive text transcripts and output a category. In an example, the category may be identified using a BERT model.

In an example, the category can be selected from a set of categories including a mis-directed category, an un-directed category, a specifically directed category, a mis-guided category, and personal. Other categories are possible. A mis-directed communication indicates that the communication was intended for the forwardee but placed in the message box of the recipient instead. For example, a VM that is left in Alice's VM inbox may start with "Hi Bob." As such, the VM should have been left in Bob's VM inbox but, for whatever reason, the caller was mis-directed to Alice's VM inbox. An un-directed communication indicates that the caller does not know who specifically should receive the communication. For example, an email or a VM may include "I don't know who to direct this message to, so sending to you hoping you can forward it to correct person." A specifically directed communication indicates that the caller is directing the communication to the callee when in fact the caller knows that the correct recipient should have been someone else. For example, a VM may include "Hi Cain, I am leaving you this message since Abel is out." A mis-guided communication indicates that the communication should have been directed to another person having the same name as the callee. For example, a VM left in the VM inbox of a callee named Joe and who works in the IT department may include "Hi Joe, I was overcharged by $40 yesterday." As such, the VM should have probably been directed to a "Joe" who may be in the customer service department or the finance department instead of the user named "Joe" of the IT department. A communication categorized as personal indicates that the communication does not seem to be related to the business of the callee or the employer of the callee. Communications categorized as personal are not automatically forwarded, such as by the rules tool 428, to any forwardee. In an implementation, no forwardees are identified for communications categorized as personal.

The templating tool 422 can use template matching to identify user names or data for identifying potential forwardees. The names identified by the templating tool 422 can be used by the directory tool 418 to identify potential forwardees. For example, the templating tool 422 can use regular expression matching, NLP, or any other technique to identify names in greetings. Typically, greetings are uttered/stated upfront in a communication. The templating tool 422 may identify names in greetings in the first predetermined number of words (e.g., 8) of the communication. To illustrate, the templating tool 422 may be configured to identify the name "Joe" in any of the greetings, "Joe, hello," "Hi Joe," "Hello Joe," "How are you Joe," "What's up Joe," "Hey Joe, how have you been?" or any other such greetings.

The templating tool 422 may include templates, patterns, algorithms, machine learning models, or the like for identifying data that are used in identifying potential forwardees in portions of the transcript that may not be a greeting. As mentioned above with respect to the directory tool 418, the data for identifying potential forwardees can be a full name, a partial name, a nickname, a job function, a title, a telephone number, an extension number, any data that may be used to identify a user, or a combination thereof.

The forwardee identification tool 424 identifies potential forwardees of a communication. The forwardee identification tool 424 identifies the potential forwardees based on a textual analysis of the communication. Text analysis encompasses using at least one of the content analysis result obtained by the content analysis tool 416, results obtained by the templating tool 422, or user information maintained by (e.g., managed by, stored in conjunction with) or results obtained from the directory tool 418 to identify the one or more forwardees.

The forwardee identification tool 424 can use the names identified by the templating tool 422 to obtain matching users from the directory tool 418. For example, the forwardee identification tool 424 can transmit the transcript obtained from the transcription tool 414 to the directory tool 418 to obtain data for identifying potential forwardees. The forwardee identification tool 424 can forward the data for identifying potential forwardees to the directory tool 418 to obtain a list of potential forwardees that match the data for identifying potential forwardees. In an example, the forwardee identification tool 424 may be configured to request potential forwardees that are within a predefined relationship strength (e.g., 3, 4) of the callee.

In some implementations, the forwardee identification tool 424 can be a machine learning model (e.g., a natural language processing (NLP) model) that receives the content analysis result, including the transcript, and outputs the one or more forwardees. Outputting the one or more forwardees can include outputting respective contact information, organizational information, and/or other information associated with the one or more forwardees.

For example, and as described above, at least some users may be associated (such as in the data store 406, or some other data store) with respective keywords, skill descriptions, job descriptions, and tags (collectively, capabilities). The forwardee identification tool 424 can semantically match the capabilities to the content analysis result to identify a forwardee to whom a communication may be transmitted.

In an example, the forwardee identification tool 424 can filter (e.g., reduce) the list of potential forwardees obtained from the directory tool 418 by matching the capabilities to the content analysis result. For each of the potential forwardees, a match strength can be obtained according to a level of match. In an example, the forwardee identification tool 424 discards potential forwardees that do not meet a match strength threshold.

The UI tool 426 can be used to generate user interfaces with which a user can interact to obtain information regarding communication inboxes that the user is authorized to access and the communications therein. For example, the UI tool 426 may generate UIs that allow users (e.g., callees) to perform actions with respect to the VM inboxes and/or the VMs therein. The UI tool 426 can use one of the tools of the communication software 404 or the software platform 402 to obtain the information and/or cause the actions to be performed.

The UI tool 426 can generate user interfaces in different modalities. The modality can depend on the type of callee device 410 or the mechanism via which the callee device 410 connects to or requests the services of the software platform 402. For example, the callee device 410 may connect to the software platform 402 using a telephony connection. As such, the generated user interface may be an interactive voice response (IVR) interface via which the callee may listen to a VM, obtain forwardee recommendations for the VM, and forward the VM to one of the recommended forwardees. In another example, a user may access the communication software 404 using a voicemail application or a web browser and the UI tool 426 may generate a rich graphical user interface, such as described with respect to FIG. 5.

The rules tool 428 can be used to configure rules for automatically forwarding communications to forwardees. Users can configure rules for their own communications. A rule configured using the rules tool 428 can include one or more conditions under which a communication should be automatically forwarded and criteria related to the forwardees. In an example, a condition can relate to whether the callee has not reviewed the communication within a certain period of time since the communication was received. Reviewing a communication can include listening to the communication (in the case of the VM), watching the communication (in the case of a video-based communication), or reading the communication (in the case of an email or other text-based communications). In an example, a condition can relate to the category of the communication. In another example, a condition can may relate to a topic identified in the content analysis result. In yet another example, a criterion related to the forwardees can be based on a number (cardinality) of the identified potential forwardees.

Non-limiting examples of rules that can be configured using, and executed by, the rules tool 428 can be as follows. A rule can essentially state "if a VM is not listened to within 2 days and is a specifically directed VM, then forward if only 1 potential forwardee is identified." That is, if the callee does not listen to a specifically directed VM within 2 days of receipt, then the VM is forwarded to the identified forwardee but only if one (and no more than one) potential forwardee is identified by the forwardee identification tool 424. A rule can essentially state "if no name and un-directed communication, then forward to <topic>: #department." That is, if no specific person's name is mentioned in the communication, then identify (using the directory tool 418) a number of a shared voicemail inbox or an email address of the department that handles the topic identified in the content analysis result. A rule can essentially state "if mis-directed, then forward to <greeting: name>:2." That is, if the communication is misdirected, then forward it to a potential forwardee whose name matches the name identified in the greeting of the communication but only if the relationship strength between the callee and a potential forwardee is no more than 2 (that is, the potential forwardee is a peer of the callee). A rule can essentially state "if <no name> and un-directed communication, then forward to <extension: 124>," where extension 124 is that of a front desk receptionist or a switchboard operator.

The analytics tool 430 can be used to provide (e.g., generate) reports regarding forwardee selections by users. In an example, the analytics tool 430 or results therefrom can be used (such as by the rules tool 428) to automatically forward communications or to at least recommend to users automatic forwarding rules, which users may accept or reject. For example, the analytics tool 430 can use content analysis results of communications and historical forwarding data to identify patterns of forwardee selections by callees. To illustrate, the analytics tool 430 may determine that 70% (or some other threshold) of VMs pertaining to interest in Ford Broncos have been forwarded to the user Anna Karenina at extension 721. As such, the rules tool 428 can add, or recommend to a user to accept, a rule that essentially indicates "if <theme:interest><product:Ford Bronco>, then <forward:x721>."

Figure 5:
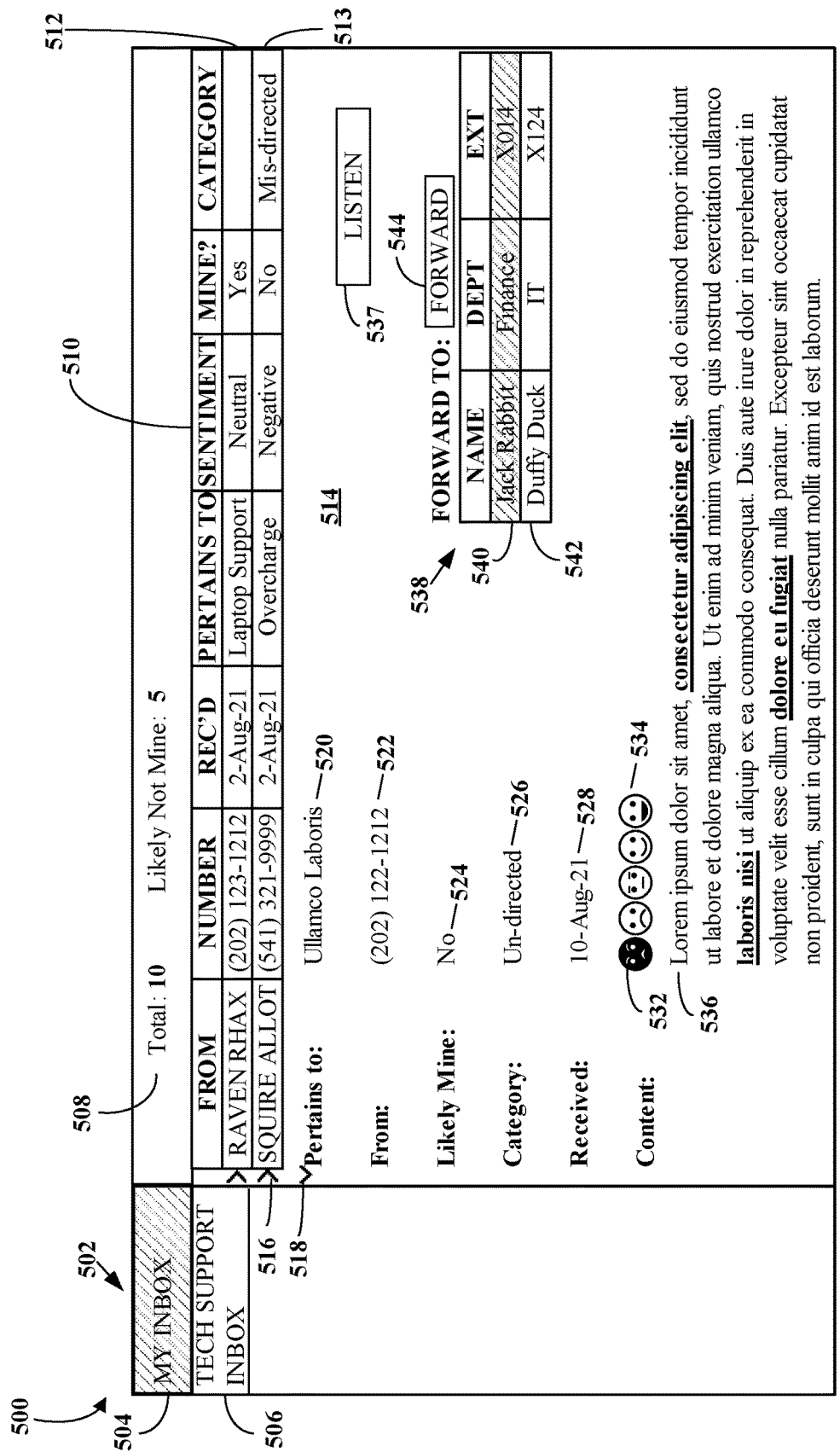
FIG. 5 is an example of a user interface for a VM inbox with forwardee suggestions.

FIG. 5 is an example of a UI 500 for a VM inbox with forwardee suggestions. The UI 500 can be, at least partially, generated by the UI tool 426 of FIG. 4. The UI 500 is but an illustrative UI and the disclosure herein is not in any way limited by the information, actions, or UI controls displayed in the UI 500, or the arrangement of such information, actions, or controls. Other information, actions, controls, and arrangements are possible.

A current user can access (such as using an application or a web browser) the software platform 402 to obtain the UI 500. A list 502 lists all the voicemail inboxes that the user has access to. The UI 500 illustrates that the user has access to a personal VM inbox 504 and a VM inbox 506. The VM inbox 506 is a VM inbox that a group of users, of which the current user is a member, can access. The UI 500 illustrates (via a fill pattern) that the user has selected the personal VM inbox 504 to display information regarding VMs in the personal VM inbox 504.

A header 508 displays summary information regarding the VMs in the personal VM inbox 504. The header 508 indicates that the personal VM inbox 504 includes a total of 10 VMs and that 5 of the 10 VMs are likely to be not specifically targeted for the current user and that such VMs may be subject to forwarding to one or more forwardees. A list 510 displays a respective row (such as a row 512) for each of the VMs in the personal VM inbox 504. The UI 500 shows only the first three of the 10 VMs of the personal VM inbox 504. As can be appreciated, the list 510 may include facilities (not shown) for filtering, sorting, and searching.

The row 512 illustrates that the respective VM was received on Aug. 2, 2021, from the caller telephone number "(202) 123-1212," for which a caller ID (i.e., "RAVEN RHAX") is identified; and that the content analysis result includes that the VM pertains to "Laptop Support" and that the sentiment associated with the VM is "Neutral." The row 512 also indicates that the communication software 404 has identified the VM as being targeted at the current user and, therefore, it is not further categorized and no forwardees are identified for this VM. Contrastingly, a row 513 indicates that the communication software 404 has identified the corresponding VM as not being targeted at the current user and, therefore, it is further categorized as "Mis-directed" and forwardees (not shown) would be identified for this VM (such as described with respect to detailed information 514).

UI controls can be used to expand a row (to display detailed information) or collapse a detailed information (to display less information) about a VM. The user can use an expander 516 to display detailed information and can use a collapser 518 to show less information. The detailed information 514 illustrates information and actions of a third row of the list 510. The VM of the detailed information 514 pertains to the topic or theme "Ullamco Laboris" (as indicated by a field 520); that the VM was received from the caller telephone number indicated by a field 522; that the VM, as shown in a field 524, is not likely to be specifically targeted at the current user and that the VM is categorized, as shown in a field 526, as "Un-directed" with respect to the current user; and that the VM was left in the personal VM inbox 504 on the date indicated by the field 528. A sentiment (a dark icon 532) indicates, in a sentiment meter 534, the sentiment associated with the VM. A field 536 displays the transcript of the VM. The current user can use a control 537 to listen to the VM.

Since the detailed information 514 indicates that the VM should be forwarded to one or more forwardees, the UI 500 includes a list 538 of potential forwardees identified by the communication software 404. As such, the UI 500 displays indications of the forwardees. The list 538 can include the names of the potential forwardees. The list 538 can also include additional information for each of the potential forwardees. As shown, the list 538 includes two potential forwardee: a forwardee 540 and a forwardee 542. The list 538 can include more or fewer potential forwardees. The forwardee 540 is named "Jack Rabbit," works in the Finance department, and has the telephone extension number 104. The forwardee 542 is named "Duffy Duck," works in the IT department, and has the telephone extension number 124. As can be appreciated, the list 510 may include facilities (not shown) for filtering, sorting, and searching. In an example, the list 538 may be sorted, or sortable, based on respective relationship strengths of the user to the potential forwardees listed in the list 538. For example, the potential forwardees can be listed in ascending relationship strengths so that potential forwardees who are organizationally (i.e., hierarchically) closer to the user are listed before those who are organizationally more distant from the user.

In an example, when a potential forwardee of the list 538 is selected (such as indicated by the fill pattern of the forwardee 540), the communication software 404 can cause words, expressions, names, and/or sentences of the transcript to be highlighted in the field 536 indicating to the current user why the potential forwardee was identified by the communication software 404. That is, the communication software 404 can provide an explanation as to why the communication software 404 selected the potential forwardee. The UI 500 illustrates that the communication software 404 identified Jack Rabbit as a potential forwardee because of the expressions "consectetur adipiscing elit," "laboris misi," and "dolore eu fugiat," which the communication software 404 may have at least partially matched to one or more of a job description, skills, tags, or any other information associated with the user named "Jack Rabbit" and/or based on an organizational relationship with the current user. As such, UI 500 displays indications of portions of the communication used to identify the forwardee.

A control 544 can cause the communication software 404 to forward the VM to the selected forwardees in the list 538. In FIG. 5, only one forwardee is selected (i.e., the forwardee 540). However, the user may select more than one forwardee. In response to the user using the control 544, the server 400 receives a request to forward the VM to the selected forwardees. The request includes indications of the forwardees. The indications can be used by the communication software 404 to identify the selected forwardees (e.g., identify inboxes of the selected forwardees). The indications can be row numbers of the list 538, user identifiers (e.g., unique user ids) of the selected rows of the list 538, or any other indications that the communication software 404 can use to uniquely identify the selected forwardees.

Figure 6:
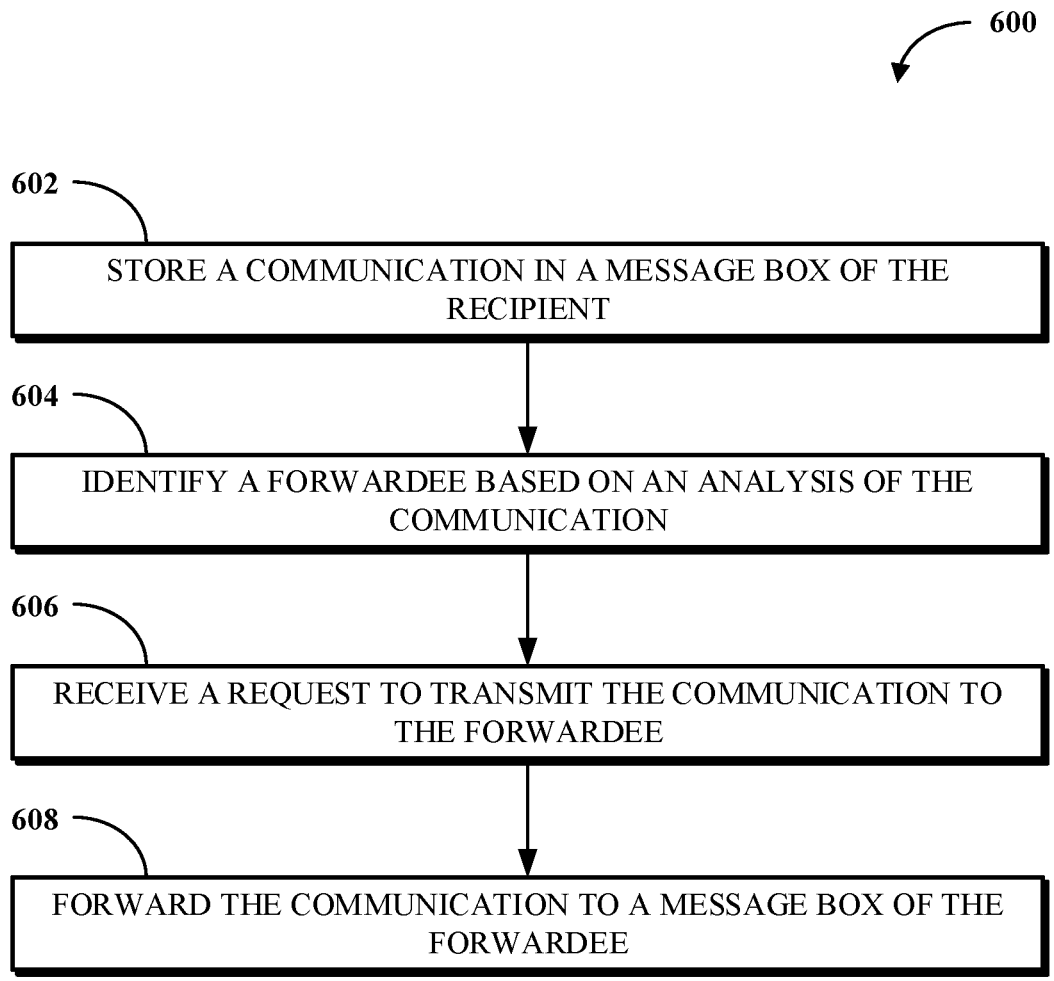
FIG. 6 is a flowchart of an example of a technique for identifying forwardees of communications.

FIG. 6 is a flowchart of an example of a technique 600 for identifying forwardees of communications. The technique 600 can be executed using computing devices, such as the systems, hardware, and software described with respect to FIGS. 1-5. The technique 600 can be performed, for example, by executing a machine-readable program or other computer-executable instructions, such as routines, instructions, programs, or other code that may be stored in a memory (i.e., a non-transitory computer-readable storage medium). The steps, or operations, of the technique 600 or another technique, method, process, or algorithm described in connection with the implementations disclosed herein can be implemented directly in hardware, firmware, software executed by hardware, circuitry, or a combination thereof.

For simplicity of explanation, the technique 600 is depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

At 602, a communication that is directed to a recipient is stored in a message box of the recipient. A caller may use contact information of the recipient to direct a communication to the recipient. For example, the caller may dial a telephone number associated with the recipient and leave a VM for the recipient. As such, the software platform 402 may store the VM in a VM box of the recipient. In one configuration, a sender may use an email address associated with the recipient to transmit an email to the recipient. As such, the software platform 402, which may be or include an email server, may store the email in an email inbox of the recipient.

At 604, a forwardee is identified based on an of the communication. The analysis can be textual analysis, a sentiment analysis, an analysis of a tone used in the communication, or a combination thereof. Identifying the forwardee based on the analysis of the communication can include determining that the communication includes data for identifying the forwardee and identifying the forwardee based on the data for identifying the forwardee. In an example, the forwardee may be identified in response to a request, such as from the recipient, to display information relating to the communication, such as described with respect to FIG. 5.

In an example, and as described above, the data for identifying the forwardee may be at least one of a full name, a partial name, a nickname, a job function, a title, a telephone number, an extension number, or any similar data that may be used to identify a forwardee. In an example, the data for identifying the forwardee may be identified in a portion of the communication that may be identified as a greeting, such as described with respect to templating tool 422 of FIG. 4. As such, determining that the communication includes the data for identifying can include identifying that a portion of the communication constitutes a greeting and determining that the portion of the communication constituting the greeting includes the data for identifying to the forwardee.

In an example, and as described above, identifying the forwardee based on the textual analysis of the communication can include identifying, based on the textual analysis, a topic associated with the communication and identifying the forwardee based on the topic. For example, a content analysis result of a text of the communication can be matched to capabilities associated with users of a directory of users. The directory may be organized in one or more hierarchies, such as an organization chart, a team chart, a responsibility chart, or any other hierarchy that is used to relate users, such as employees of an organization.

In an example, identifying the forwardee based on a textual analysis of the communication can include identifying a plurality of forwardees and ranking the plurality of forwardees according to a criterion. In an example, the criterion can be related a relationship strength, such as in descending (or ascending) order of the respective relationship strengths between the recipient and each of the plurality of forwardees.

At 606, a request to transmit (e.g., forward) the communication to the forwardee is received. In an example, the request may be received from the recipient, such as in response to the recipient invoking a forward action as described with respect to the control 544 of FIG. 5. In another example, the request may be received in response to an automated rule to forward the communication, such as described with respect to at least one of the analytics tool 430 or the rules tool 428 of FIG. 4.

At 608, the communication is forwarded to a message box of the forwardee. Forwarding (e.g., transmitting, sending) the communication to the second message box of the forwardee can mean or include storing a copy of the communication in the message box of the forwardee.

In an example, the technique 600 can further include receiving an indication of a potential forwardee and identifying portions in a transcript of the communication that are related to the potential forwardee, such as described with respect to FIG. 5. The portions of the transcript can be identified in any number of ways. For example, the portions may be highlighted, underlined, bolded, or identified in any other way.

In some implementations, forwardee identification may be performed in real-time in connection with a received telephone call. For example, a reception desk operator may receive a telephone call (i.e., a session associated with a communication) from a caller and a list of potential forwardees may be identified (and updated) as the caller is speaking. The UI tool 426 may display, to the reception desk operator, a user interface associated with the telephone call that includes, for example, a caller ID of the caller, the call duration, and a real-time list of potential forwardees, as described below. In a similar use case, any user may receive a telephone call and may transmit a request to the server 400 to identify a list of potential forwardees. For example, the UI tool 426 may display, to the user, a user interface associated with the telephone and includes an action that the user can invoke to request that the server 400 identify a real-time list of potential forwardees.

The list of potential forwardees may be updated as new portions of speech (e.g., every 2, 5 or some other number seconds of speech or when a pause in the speech is detected) are obtained from the caller. After receiving a new portion of the speech, the new portion of the speech can be transcribed to obtain an updated transcript. The content analysis tool 416 can analyze the updated transcript in real-time to obtain an updated content analysis result. The forwardee identification tool 424 can generate an updated real-time list of potential forwardees based on the updated content analysis result. The real-time list of potential forwardees can be displayed to the user similarly to the 538 of FIG. 5. The UI can include a forward action and a conference action. The user can select a forwardee in the real-time list of potential forwardees and invoke the forward action, which transmits a forward request to the server 400. In response to receiving the forward request, the software platform 402 transfers the call to a telephone number of the selected forwardee. The user can select a forwardee in the real-time list of potential forwardees and invoke the conference action, which transmits a conferencing request to the software platform 402. In response to receiving the conference request, the software platform 402 initiates a 3-way conference call between the callee, the caller, and the selected forwardee. That is, the server 400 causes the telephone number of the selected forwardee to ring and when the selected forwardee answers, the selected forwardee is added to the telephone call.

In some implementations, forwardee identification may be performed in real-time in connection with a received text message. For example, a recipient may receive a text message from a sender in a session associated with a communication, such as in a text-messaging application, and obtain forwardee suggestions in the messaging application from the server 400. As described above with respect to the rules tool 428, in some implementations, the technique 600 can further include storing a communication directed to the recipient in the message box of the recipient and automatically forwarding, based on a condition, the second communication to a second forwardee that is identified based on a textual analysis of the second communication. The condition can include that the recipient has not reviewed the communication within a predefined period of time. The condition can include that a topic of the communication identified during the analysis is handled by the forwardee and not by a recipient of the communication.

Figure 7:
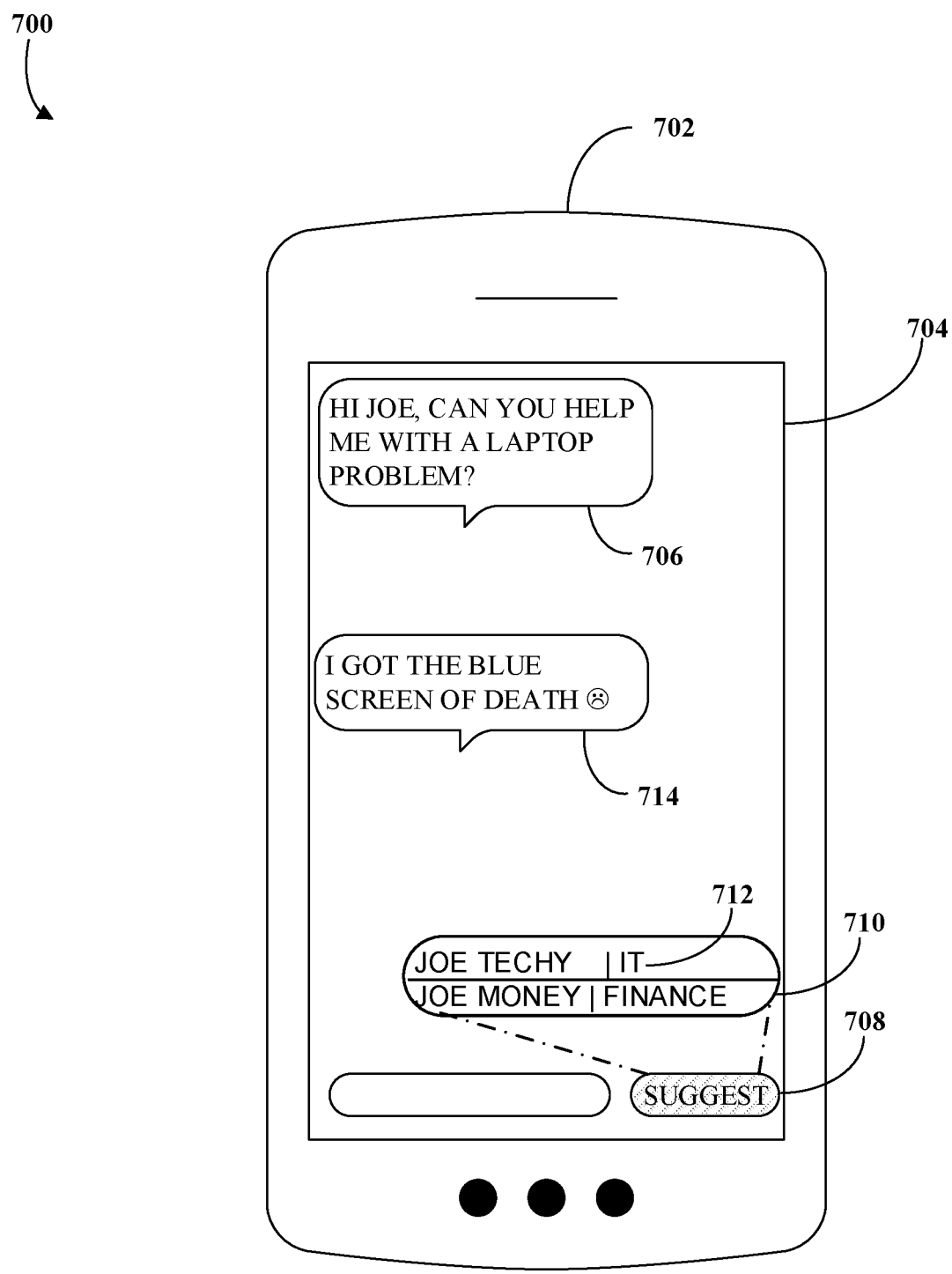
FIG. 7 is an example of obtaining forwardee suggestions in a text messaging application.

FIG. 7 is an example 700 of obtaining forwardee suggestions in a text messaging application. A recipient may receive, on a user device 702 of the recipient, a text message 706 in a UI 704 of a messaging application. The user device 702 can be the callee device 410 of FIG. 4. The recipient may determine that she is not the intended recipient of the text message 706. Thus, the recipient can use a control 708 to cause a request to be transmitted to the software platform 402 of FIG. 4 to obtain forwardee suggestions based on the received text message 706. A request that includes the contents of the text message 706 may be transmitted in the request. Alternatively, the text message 706 may already be accessible to the software platform 402. As described above, the forwardee identification tool 424 may obtain and transmit or, cause to be transmitted, to the user device 702 (i.e., the messaging application therein) a list 710 of potential forwardees.

The control 708 may act as a toggle such that, for example, if the control 708 is long pressed by the user, the list 710 is refreshed every time a new text message is received. That is, for example, in response to the messaging application receiving a second message 714, the messaging application automatically transmits a second request to the software platform 402 to obtain an update to the list 710. In another example, the user of the user device 702 can request an update to the list 710 by explicitly invoking the control 708. Any update to the list 710 is obtained by the forwardee identification tool 424 using all the received text messages (e.g., using the text message 706 and the second message 714).

In response to the user selection of a forwardee (e.g., a forwardee 712), the server 400 can cause the selected forwardee to be added to the chat session between the sender and the recipient. In some implementations, the user may use controls (not shown) of the UI 704 to cause the software platform 402 to transmit the message history to the selected forwardee and transmit a message (e.g., "your texts are transferred to Joe Techy in IT") to the sender informing the sender that the sender should continue the chat session with the selected forwardee.

Figure 8:
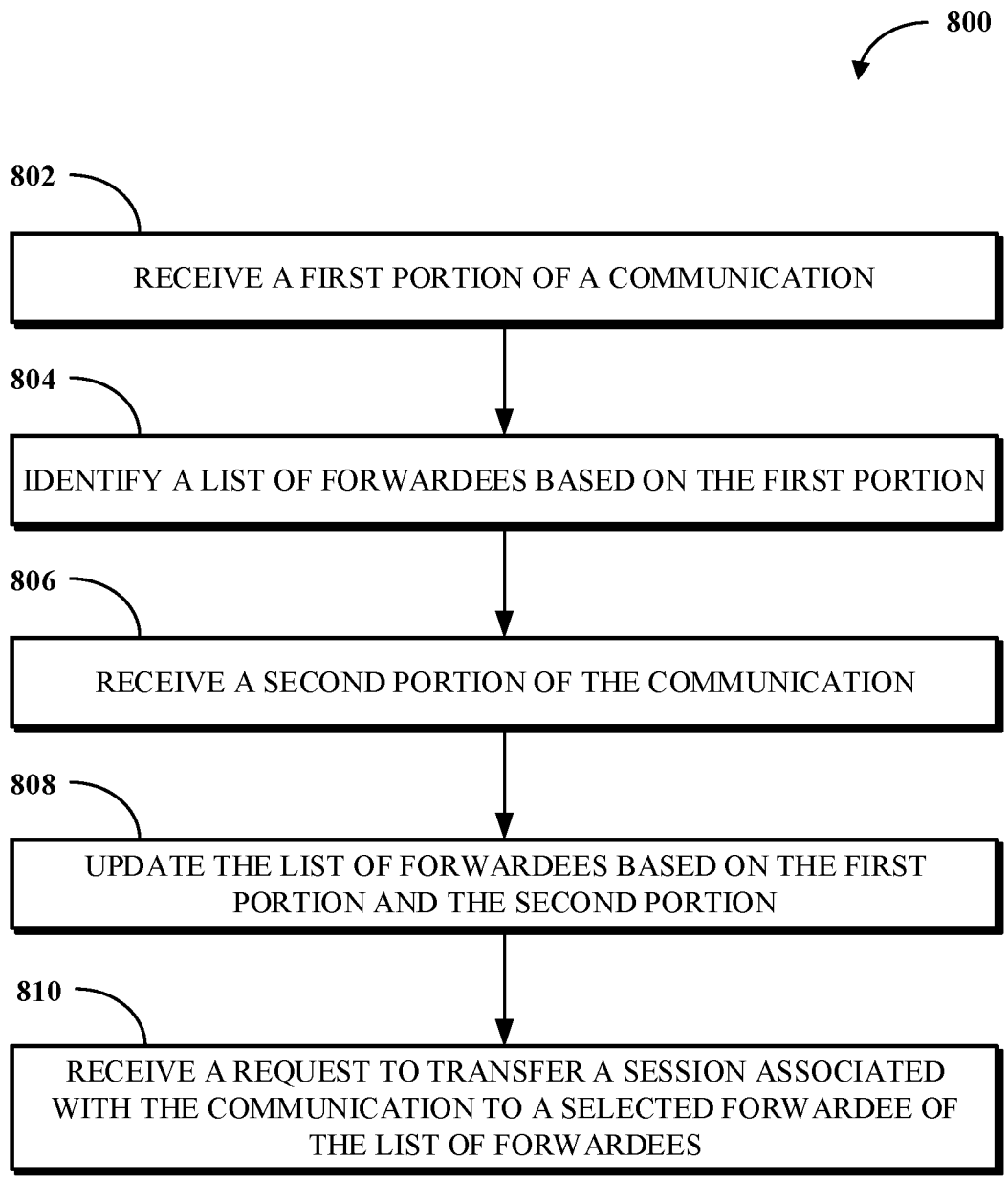
FIG. 8 is a flowchart of an example of a technique for identifying forwardees of communications in real-time.

Accordingly, FIG. 8 is a flowchart of an example of a technique 800 for identifying forwardees of communications in real-time. At 802, a first portion of a communication is received. At 804, a list of forwardees is identified based on the first portion. At 806, a second portion of the communication is then received. At 808, the list of forwardees can be updated based on the first portion and the second portion. At 810, a request to transfer a session associated with the communication to a selected forwardee of the list of forwardees is received (such as from callee or recipient). The request can be received by the communication software 404. As described above, the first portion and the second portion can include voice data and the session associated with the communication can be a telephone call. As also described above, the first portion and the second portion can include text data (e.g., text messages) and the session associated with the communication can be a text-messaging conversation.

Some implementations may include a method that includes storing a communication directed to a recipient in a message box of the recipient. A forwardee is identified based on an analysis of the communication. A request to transmit the communication to the forwardee is received. The communication is forwarded to a message box of the forwardee. In an example, Identifying the forwardee based on the analysis of the communication may include determining that the communication includes data for identifying the forwardee and identifying the forwardee based on the data for identifying to the forwardee. In an example, identifying the forwardee may include identifying that a portion of the communication constitutes a greeting. The forwardee is then identified based on an analysis of the greeting. In an example, identifying the forwardee based on the analysis of the communication may include performing a textual analysis of the communication to determine a topic associated with the communication. In an example, identifying the forwardee based on the analysis of the communication may include performing a textual analysis of the communication to determine a directory of users including the forwardee associated with the communication. The forwardee is then identified based on an analysis of the directory of users. The forwardee may then be identified based on the topic. The method may include displaying information related to the communication and an indication of the forwardee. Indications of portions of the communication used to identify the forwardee may be displayed.

Some implementations may include a device that includes a memory and a processor. The processor may be configured to execute instructions stored in the memory to store a communication in a message box, identify a forwardee based on an analysis of the communication, receive a request to transmit the communication to the forwardee, and forward the communication to a message box of the forwardee. The processor may be configured to execute instructions stored in the memory to obtain a list of potential forwardees based on a textual analysis of the communication, wherein the list of potential forwardees includes the forwardee. The processor may be configured to execute instructions stored in the memory to receive an indication of a potential forwardee. Portions in a transcript of the communication that are related to the potential forwardee may be identified. The processor may be configured to execute instructions stored in the memory to sort a list of potential forwardees based on respective relationship strengths of a recipient of the communication to the potential forwardees. The communication can be a text-based communication. The communication can include voice data. Receiving a request to transmit the communication to the forwardee can include automatically forwarding, based on a condition, the communication to the forwardee. The condition can include multiple conditions. An example of a condition can include that a recipient has not reviewed the communication within a predefined period of time. An example of a condition can include that a topic of the communication identified during the analysis is handled by the forwardee and not by a recipient of the communication.

Some implementations include a non-transitory computer readable medium that stores instructions operable to cause one or more processors to perform operations including storing a communication directed to a recipient in a message box of the recipient. A forwardee is identified based on an analysis of the communication. A request to transmit the communication to the forwardee may be received. The communication may be forwarded to a message box of the forwardee. Identifying the forwardee based on the analysis of the communication may include performing a textual analysis of the communication to determine a topic associated with the communication. The forwardee may then be identified based on the topic. The operations may also include displaying information related to the communication and an indication of the forwardee. Indications of portions of the communication used to identify the forwardee may be displayed. The operations may also include obtaining a list of potential forwardees based on a textual analysis of the communication, wherein the list of potential forwardees includes the forwardee. The list of potential forwardees may be displayed sorted based on respective relationship strengths of the recipient to the potential forwardees. Receiving a request to forward the communication to the forwardee may include automatically forwarding, based on a condition, the communication to the forwardee, wherein the condition comprises that the recipient has not reviewed the communication within a predefined period of time or that a topic of the communication identified during the analysis is handled by the forwardee and not by the recipient.

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, look-up tables, and the like), which can carry out a variety of functions under the control of one or more microprocessors or other control devices. Similarly, where the elements of the disclosed implementations are implemented using software programming or software elements, the systems and techniques can be implemented with a programming or scripting language, such as C, C++, Java, JavaScript, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques disclosed herein could employ a number of conventional techniques for electronics configuration, signal processing or control, data processing, and the like. The words "mechanism" and "component" are used broadly and are not limited to mechanical or physical implementations, but can include software routines in conjunction with processors, etc. Likewise, the terms "system" or "tool" as used herein and in the figures, but in any event based on their context, may be understood as corresponding to a functional unit implemented using software, hardware (e.g., an integrated circuit, such as an ASIC), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device.

Other suitable mediums are also available. Such computer-usable or computer-readable media can be referred to as non-transitory memory or media, and can include volatile memory or non-volatile memory that can change over time. The quality of memory or media being non-transitory refers to such memory or media storing data for some period of time or otherwise based on device power or a device power cycle. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method implemented by a server, comprising:
storing a communication directed to a recipient in a message box of the recipient, wherein the communication is an electronic communication, and wherein the message box is an electronic message box that stores electronic messages;
identifying a forwardee based on an analysis of the communication, wherein identifying the forwardee based on the analysis of the communication comprises:
obtaining, using an automatic speech recognition (ASR) software that performs speech to text conversion, a portion of the communication;
identifying that the portion of the communication constitutes a greeting by template matching the portion of the communication to at least one greeting template of a set of greeting template;
identifying a name in the greeting based on the at least one greeting template;
determining whether the name in the greeting corresponds to the recipient; and
in response to determining that the name in the greeting does not correspond to the recipient, identifying the forwardee based on the name in the greeting;
receiving a request to transmit the communication to the forwardee; and
forwarding the communication to a message box of the forwardee.

2. The method of claim 1, wherein identifying the forwardee based on the analysis of the communication comprises:
   determining that the communication includes data for identifying the forwardee; and
   identifying the forwardee based on the data for identifying to the forwardee.

3. The method of claim 1, wherein identifying the forwardee based on the analysis of the communication comprises:
   determining a topic associated with the communication; and
   identifying the forwardee based on the topic.

4. The method of claim 1, further comprising:
   displaying information related to the communication and an indication of the forwardee; and
   displaying indications of portions of the communication used to identify the forwardee.

5. The method of claim 1, wherein identifying the forwardee based on the analysis of the communication comprises:
   determining a directory of users including the forwardee associated with the communication; and
   identifying the forwardee based on an analysis of the directory of users.

6. A server, comprising:
   a memory; and
   a processor, the processor configured to execute instructions stored in the memory to:
      store a communication directed to a recipient in a message box of the recipient, wherein the communication is an electronic communication, and wherein the message box is an electronic message box that stores electronic messages;
      identify a forwardee based on an analysis of the communication, wherein to identify the forwardee based on the analysis of the communication comprises to:
         obtain, using an automatic speech recognition (ASR) software that performs speech to text conversion, a portion of the communication;
         identify that the portion of the communication constitutes a greeting by template matching the portion of the communication to at least one greeting template of a set of greeting template;
         identify a name in the greeting based on the at least one greeting template;
         determine whether the name in the greeting corresponds to the recipient; and
         in response to determining that the name in the greeting does not correspond to the recipient, identify the forwardee based on the name in the greeting;
      receive a request to transmit the communication to the forwardee; and
      forward the communication to a message box of the forwardee.

7. The server of claim 6, wherein the processor is further configured to execute instructions stored in the memory to:
   obtain a list of potential forwardees based on a textual analysis of the communication, wherein the list of potential forwardees includes the forwardee.

8. The server of claim 6, wherein the processor is further configured to execute instructions stored in the memory to:
   receive an indication of a potential forwardee; and
   identify portions in a transcript of the communication that are related to the potential forwardee.

9. The server of claim 6, wherein the processor is further configured to execute instructions stored in the memory to:
   sort a list of potential forwardees based on respective relationship strengths of the recipient to the potential forwardees.

10. The server of claim 6, wherein the communication comprises voice data.

11. The server of claim 6, wherein to receive a request to transmit the communication to the forwardee comprises to:
    automatically forward, based on a condition, the communication to the forwardee.

12. The server of claim 11, wherein the condition comprises that the recipient has not reviewed the communication within a predefined period of time.

13. The server of claim 11, wherein the condition comprises that a topic of the communication identified during the analysis is handled by the forwardee and not by the recipient.

14. A non-transitory computer readable medium storing instructions operable to cause one or more processors of a server to perform operations comprising:
    storing a communication directed to a recipient in a message box of the recipient, wherein the communication is an electronic communication, and wherein the message box is an electronic message box that stores electronic messages;
    identifying a forwardee based on an analysis of the communication, wherein identifying the forwardee based on the analysis of the communication comprises:
       obtaining, using an automatic speech recognition (ASR) software that performs speech to text conversion, a portion of the communication;
       identifying that the portion of the communication constitutes a greeting by template matching the portion of the communication to at least one greeting template of a set of greeting template;
       identifying a name in the greeting based on the at least one greeting template;
       determining whether the name in the greeting corresponds to the recipient; and
       in response to determining that the name in the greeting does not correspond to the recipient, identifying the forwardee based on the name in the greeting;
    receiving a request to transmit the communication to the forwardee; and
    forwarding the communication to a message box of the forwardee.

15. The non-transitory computer readable medium of claim 14, wherein identifying the forwardee based on the analysis of the communication comprises:
    determining a topic associated with the communication; and
    identifying the forwardee based on the topic.

16. The non-transitory computer readable medium of claim 14, wherein the operations further comprise:
    displaying information related to the communication and an indication of the forwardee; and
    displaying indications of portions of the communication used to identify the forwardee.

17. The non-transitory computer readable medium of claim 14, wherein the operations further comprise:
    obtaining a list of potential forwardees based on a textual analysis of the communication, wherein the list of potential forwardees includes the forwardee; and
    displaying the list of potential forwardees sorted based on respective relationship strengths of the recipient to the potential forwardees.

18. The non-transitory computer readable medium of claim 14, wherein receiving the request to forward the communication to the forwardee comprises:
   automatically forwarding, based on a condition, the communication to the forwardee.

19. The non-transitory computer readable medium of claim 18, wherein the condition comprises that the recipient has not reviewed the communication within a predefined period of time or that a topic of the communication identified during the analysis is handled by the forwardee and not by the recipient.

* * * * *